US009120503B2

(12) United States Patent
Sugiura et al.

(10) Patent No.: US 9,120,503 B2
(45) Date of Patent: Sep. 1, 2015

(54) STEERING APPARATUS

(71) Applicant: JTEKT CORPORATION, Osaka-shi, Osaka (JP)

(72) Inventors: Tomonori Sugiura, Yamatokoriyama (JP); Kiyoto Takei, Kashihara (JP)

(73) Assignee: JTEKT CORPORATION, Osaka-shi (JP)

(*) Notice: Subject to any disclaimer, the term of this patent is extended or adjusted under 35 U.S.C. 154(b) by 0 days.

(21) Appl. No.: 14/599,111

(22) Filed: Jan. 16, 2015

(65) Prior Publication Data

US 2015/0203145 A1    Jul. 23, 2015

(30) Foreign Application Priority Data

Jan. 22, 2014  (JP) ................................. 2014-009731

(51) Int. Cl.
*B62D 1/18*    (2006.01)
*B62D 1/184*   (2006.01)
*B62D 1/189*   (2006.01)
*B62D 1/187*   (2006.01)

(52) U.S. Cl.
CPC ................ *B62D 1/184* (2013.01); *B62D 1/187* (2013.01); *B62D 1/189* (2013.01)

(58) Field of Classification Search
CPC ......... B62D 1/184; B62D 1/189; B62D 1/187
See application file for complete search history.

(56) References Cited

U.S. PATENT DOCUMENTS

| 4,732,050 | A | * | 3/1988 | Vollmer .......................... 74/493 |
| 5,338,064 | A | * | 8/1994 | Sadakata et al. .............. 280/775 |
| 5,531,317 | A | * | 7/1996 | Tomaru ......................... 280/775 |
| 2003/0172765 | A1 | * | 9/2003 | Heiml .............................. 74/493 |
| 2004/0261565 | A1 | | 12/2004 | Uphaus et al. |
| 2014/0331810 | A1 | * | 11/2014 | Okano et al. .................... 74/493 |

FOREIGN PATENT DOCUMENTS

| JP | 2005-534574 A | 11/2005 |
| JP | 2006-117196 A | 5/2006 |
| JP | 2008-239085 A | 10/2008 |

OTHER PUBLICATIONS

U.S. Appl. No. 14/577,332, filed Dec. 19, 2014 in the name of Kakishita.

* cited by examiner

*Primary Examiner* — Faye M Fleming
(74) *Attorney, Agent, or Firm* — Oliff PLC (57) ABSTRACT

A steering apparatus includes a gear lock mechanism that fastens a first side plate to a second side plate by a fastening member. In a lock operation, a main body of the fastening member of a fastening mechanism presses a second tooth row forming member toward the first side plate, and a guided projection of the fastening member rotates slightly in the range of play in a lock direction. The fastening member slightly rotates the second tooth row forming member in the lock direction via a restricting portion. During the slight rotation, a second tooth row of the second tooth row forming member is aligned with and meshes with a first tooth row of the first side plate.

7 Claims, 8 Drawing Sheets

STEERING APPARATUS

INCORPORATION BY REFERENCE

The disclosure of Japanese Patent Application No. 2014-009731 filed on Jan. 22, 2014 including the specification, drawings and abstract, is incorporated herein by reference in its entirety.

BACKGROUND OF THE INVENTION

1. Field of the Invention

The present invention relates to steering apparatuses having a tilt mechanism.

2. Description of the Related Art

Regarding steering apparatuses having a tilt mechanism, a technique is proposed in which a firm lock is achieved by causing a movable tooth row that moves together with a steering column to mesh with a stationary tooth row fixed to a vehicle body when making tilt adjustment. See, e.g., Japanese Translation of PCT International Application Publication No. 2005-534574.

However, if the tilt mechanism is locked with tooth top lands of the stationary tooth row being in contact with tooth top lands of the movable tooth row, a locked state is unstable because the stationary tooth row is not in a meshing state with the movable tooth row. This locked state is called a "half lock." The half lock may occur in the steering apparatuses of the related art.

SUMMARY OF THE INVENTION

It is one object of the present invention to provide a steering apparatus capable of preventing occurrence of a half lock.

A steering apparatus according to an aspect of the present invention includes: a steering shaft having a steering member coupled thereto; a steering column rotatably supporting the steering shaft and being pivotable about a tilt center; a first bracket that includes a first side plate having a tilt elongate hole as a first through hole and that is fixed to a vehicle body; a second bracket that includes a second side plate having a second through hole and that is fixed to the steering column; and a lock mechanism including a fastening shaft that is passed through the tilt elongate hole and the second through hole, an operation lever that rotates together with the fastening shaft, a fastening mechanism that includes a fastening member supported by the fastening shaft and that translates a rotary motion of the operation lever in a lock direction into a linear motion of the fastening member in an axial direction of the fastening shaft to fasten the first side plate to the second side plate by the fastening member, and a gear lock mechanism that performs a gear lock operation when the fastening is carried out by the fastening mechanism.

The fastening member includes a main body facing the first side plate, and a guided projection which extends from the main body into the tilt elongate hole, whose rotation is restricted with predetermined play by the tilt elongate hole, and which is guided by the tilt elongate hole when tilt adjustment is made.

The gear lock mechanism includes a first tooth row forming member that is provided on the first side plate and that forms a first tooth row formed by parallel teeth arranged in a tilt direction, and a second tooth row forming member that forms a second tooth row formed by parallel teeth that mesh with the first tooth row in a lock operation, and that is interposed between the main body of the fastening member and the first side plate and rotatably supported by the fastening shaft.

The fastening member includes a restricting portion that restricts rotation of the second tooth row forming member about a central axis of the fastening shaft to a predetermined range.

According to the steering apparatus of the above aspect, in the lock operation of rotating the operation lever in the lock direction, the fastening member rotates slightly in the range of the play in the lock direction while pressing the second tooth row forming member toward the first side plate. With the slight rotation of the fastening member, the second tooth row forming member also rotates slightly via the restricting portion accordingly. The second tooth row is aligned with and meshes with the first tooth row during the slight rotation of the second tooth row forming member. This can prevent occurrence of a half lock.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Hereafter, embodiments of the present invention will be described with reference to the accompanying drawings.

Figure 1:
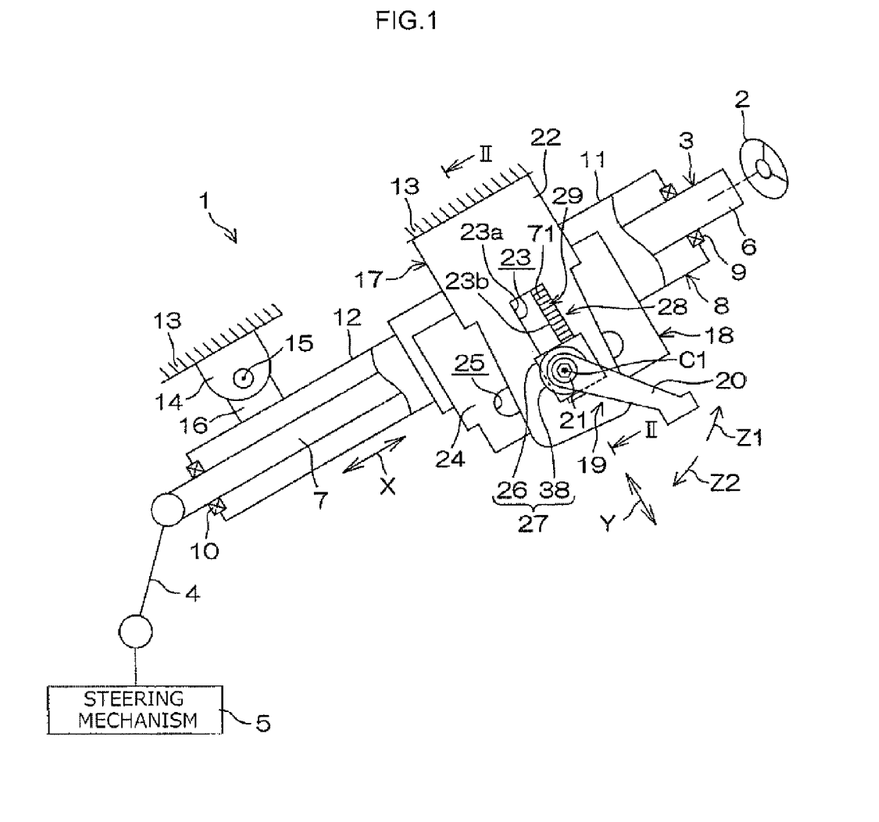
FIG. 1 is a partially cutaway schematic side view showing a schematic configuration of a steering apparatus according to a first embodiment of the present invention.

Referring to FIG. 1, a steering apparatus 1 includes a steering member 2 such as a steering wheel, a steering shaft 3 having the steering member 2 coupled to its one end in an axial direction X, and a steering mechanism 5 coupled to the steering shaft 3 through an intermediate shaft 4 and the like.

The steering mechanism 5 is a rack-and-pinion mechanism for steering steered wheels (not shown) synchronously with a steering operation of the steering member 2. A rotation of the steering member 2 is transmitted to the steering mechanism 5 through the steering shaft 3, the intermediate shaft 4 and the like. The rotation transmitted to the steering mechanism 5 is translated into an axial movement of a rack shaft (not shown). Thus, the steered wheels are turned.

The steering shaft 3 has a tubular upper shaft 6 and a lower shaft 7, which are fitted so as to be slidable relative to each other by, for example, spline fitting or serration fitting. The steering member 2 is coupled to one end of the upper shaft 6. The steering shaft 3 can be extended and contracted in the axial direction X through a relative sliding movement between the upper shaft 6 and the lower shaft 7.

The steering apparatus 1 includes a hollow steering column 8 rotatably supporting the steering shaft 3. The steering shaft 3 is passed through the steering column 8 and is rotatably supported by the steering column 8 through a plurality of bearings 9, 10.

The steering column 8 has an upper jacket 11 as an outer jacket and a lower jacket 12 as an inner jacket, which are fitted so as to be slidable relative to each other. The steering column 8 can be extended and contracted in the axial direction X through a relative sliding movement between the upper jacket 11 and the lower jacket 12. The upper jacket 11 rotatably supports the upper shaft 6 through the bearing 9. In addition, the upper jacket 11 is coupled to the upper shaft 6 through the bearing 9 so as to be movable together with the steering shaft 3 in the axial direction X.

The steering apparatus 1 includes a stationary bracket 14 fixed to a vehicle body 13, a tilt center shaft 15 supported by the stationary bracket 14, and a column bracket 16 fixed to an outer periphery of the lower jacket 12 and rotatably supported by the tilt center shaft 15. The steering column 8 and the steering shaft 3 are pivotable (tiltable) in a tilt direction Y (upward in the tilt direction Y1 or downward in the tilt direction Y2) about a tilt center CC that is a central axis of the tilt center shaft 15.

A position of the steering member 2 can be adjusted by pivoting (tilting) the steering shaft 3 and the steering column 8 about the tilt center CC. This adjustment is referred to as tilt adjustment. The position of the steering member 2 can be adjusted by extending and contracting the steering shaft 3 and the steering column 8 in the axial direction X. This adjustment is referred to as telescopic adjustment.

The steering apparatus 1 further includes a first bracket 17 fixed to the vehicle body 13, a second bracket 18 fixed to the upper jacket 11 of the steering column 8, and a lock mechanism 19. Locking the first bracket 17 onto the second bracket 18 by the lock mechanism 19 causes a position of the steering column 8 relative to the vehicle body 13 to be fixed, so that a position of the steering member 2 relative to the vehicle body 13 is fixed.

The lock mechanism 19 includes an operation lever 20 rotatably operated by a driver and a fastening shaft 21 capable of rotating together with the operation lever 20 and being passed through the first bracket 17 and the second bracket 18. A central axis C1 of the fastening shaft 21 corresponds to a rotation center of the operation lever 20.

The fastening shaft 21 is passed through tilt elongate holes 23 as first through holes that are respectively provided in a pair of first side plates 22 (only one of the first side plates 22 is shown in FIG. 1) of the first bracket 17 and that extend in the tilt direction Y. The fastening shaft 21 is also passed through telescopic elongate holes 25 as second through holes that are respectively provided in a pair of second side plates 24 (only one of the second side plates 24 is shown in FIG. 1) of the second bracket 18 and that extend in a telescopic direction (corresponding to the axial direction X).

A lock direction Z1 of the lock mechanism 19 is a direction in which the operation lever 20 is pushed up about the central axis C1 of the fastening shaft 21. An unlock direction Z2 of the lock mechanism 19 is an opposite direction to the lock direction Z1.

The lock mechanism 19 includes a fastening mechanism 27 and a gear lock mechanism 28. The fastening mechanism 27 includes a fastening member 26 supported by the fastening shaft 21, and fastens the first side plate 22 to the second side plate 24 by the fastening member 26 according to a rotation operation of the operation lever 20 in the lock direction Z1. The gear lock mechanism 28 performs a gear lock operation when the fastening is carried out by the fastening mechanism 27.

The fastening mechanism 27 includes a motion translation mechanism (not shown) formed on opposing surfaces of a rotatable cam 36 that rotates together with the operation lever 20 and the fastening member 26. The motion translation mechanism includes a cam projection that is provided on at least one of the opposing surfaces of the rotatable cam 36 and the fastening member 26 and that is cam-engaged with the other opposing surface. The motion translation mechanism of the fastening mechanism 27 translates a rotary motion of the rotatable cam 36 into a linear motion of the fastening member 26 in an axial direction 7 of the fastening shaft 21 to fasten the first side plate 22 to the second side plate 24 by the fastening member 26.

Figure 2:
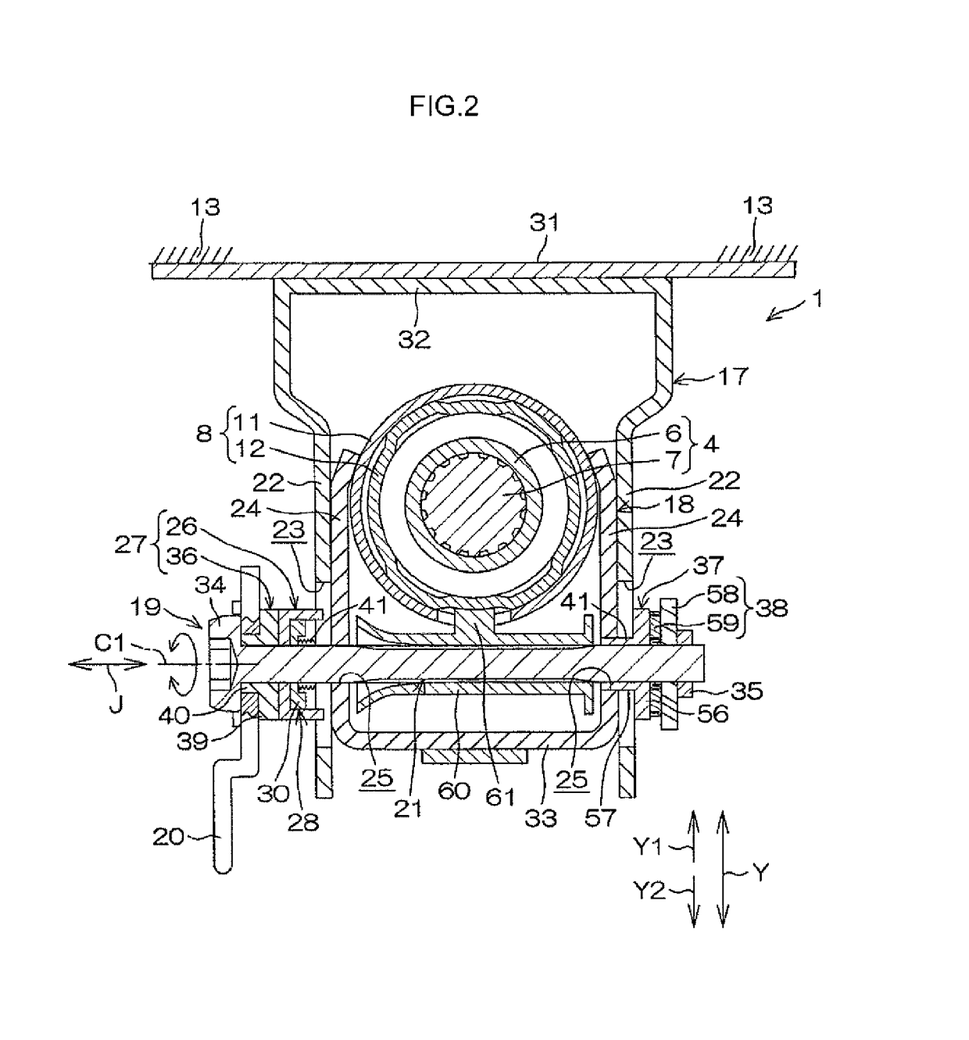
FIG. 2 is a schematic sectional view of the steering apparatus of the first embodiment taken along line II-II in FIG. 1.

The gear lock mechanism 28 includes a first tooth row forming member 29 and a second tooth row forming member 30. The first tooth row forming member 29 is provided on an outer surface of one of the first side plates 22, and forms a first tooth row 71 formed by parallel teeth arranged in the tilt direction Y. As shown in FIG. 2, the second tooth row forming member 30 is supported by the fastening shaft 21, and rotation of the second tooth row forming member 30 about the central axis C1 of the fastening shaft 21 by the fastening member 26 is restricted to a predetermined range. The second tooth row forming member 30 forms a second tooth row 72 (see FIG. 3) that meshes with the first tooth row 71 in the gear lock operation.

As shown in FIG. 2, the first bracket 17 includes an attachment plate 31 detachably supported on the vehicle body 13 via a capsule mechanism, not shown, a top plate 32 fixed along the attachment plate 31, and the first side plates 22 extending downward in the tilt direction Y from both ends of the top plate 32.

The second bracket 18 is in the shape of a groove having the second side plates 24 facing the first side plates 22 of the first bracket 17, and a connecting plate 33 connecting lower ends in the tilt direction Y of the second side plates 24.

The fastening shaft 21 is formed by a bolt extending through the tilt elongate holes 23 of the first side plates 22 of the first bracket 17 and the telescopic elongate holes 25 of the second side plates 24 of the second bracket 18. A head 34 at one end of the fastening shaft 21 is fixed so as to be rotatable together with the operation lever 20. A nut 35 is threadedly engaged with the other end of the fastening shaft 21.

The fastening mechanism 27 includes the rotatable cam 36, the first fastening member 26, the second fastening member 37, the nut 35, and an interposing member 38. The rotatable cam 36 rotates together with the operation lever 20. The fastening member 26 forms a non-rotatable cam that is cam-engaged with the rotatable cam 36, and fastens one of the first side plates 22. The second fastening member 37 fastens the other first side plate 22. The interposing member 38 is interposed between the second fastening member 37 and the nut 35.

The operation lever 20, the rotatable cam 36, the first fastening member 26 as a non-rotatable cam, and the second tooth row forming member 30 of the gear lock mechanism 28 are interposed between the head 34 of the fastening shaft 21 and the one first side plate 22. The second fastening member 37 and the interposing member 38 are interposed between the nut 35 and the other first side plate 22 of the first bracket 17. The rotatable cam 36, the first fastening member 26 (non-rotatable cam), the second tooth row forming member 30, the second fastening member 37, and the interposing member 38 are supported by an outer periphery of the fastening shaft 21. The fastening members 26, 37 and the second tooth row forming member 30 are supported so as to be movable in the axial direction J of the fastening shaft 21.

The rotatable cam 36 is coupled so as to be rotatable together with the operation lever 20, so that movement in the axial direction J of the rotatable cam 36 relative to the fastening shaft 21 is restricted. Rotation of the operation lever 20 relative to the head 34 of the fastening shaft 21 is restricted. The rotatable cam 36 includes an annular plate 39 and a boss 40 that is provided around a central hole of the annular plate 39 and that is passed through a through hole of the operation lever 20 so as to be rotatable together with the operation lever 20.

The gear lock mechanism 28 includes the first tooth row forming member 29 forming the first tooth row 71, the second tooth row forming member 30 (see FIG. 3) forming the second tooth row 72, and a biasing member 41 that is interposed between the second tooth row forming member 30 and one of the second side plates 24 and that biases the second tooth row forming member 30 in a gear lock release direction (in FIG. 2, toward the head 34 of the fastening shaft 21) as shown in FIG. 2.

The first tooth row forming member 29 is a block-shaped member fixed to the outer surface of the first side plate 22. The first tooth row forming member 29 together with the first side plate 22 may form a single member. Namely, the first tooth row forming member 29 may be formed integrally with the first side plate 22.

As shown in FIG. 1, the first tooth row forming member 29 is placed on one side of the tilt elongate hole 23. The tilt elongate hole 23 includes a pair of edges 23a, 23b extending in the tilt direction Y. The first tooth row forming member 29 is placed near the edge 23b.

Figure 3:
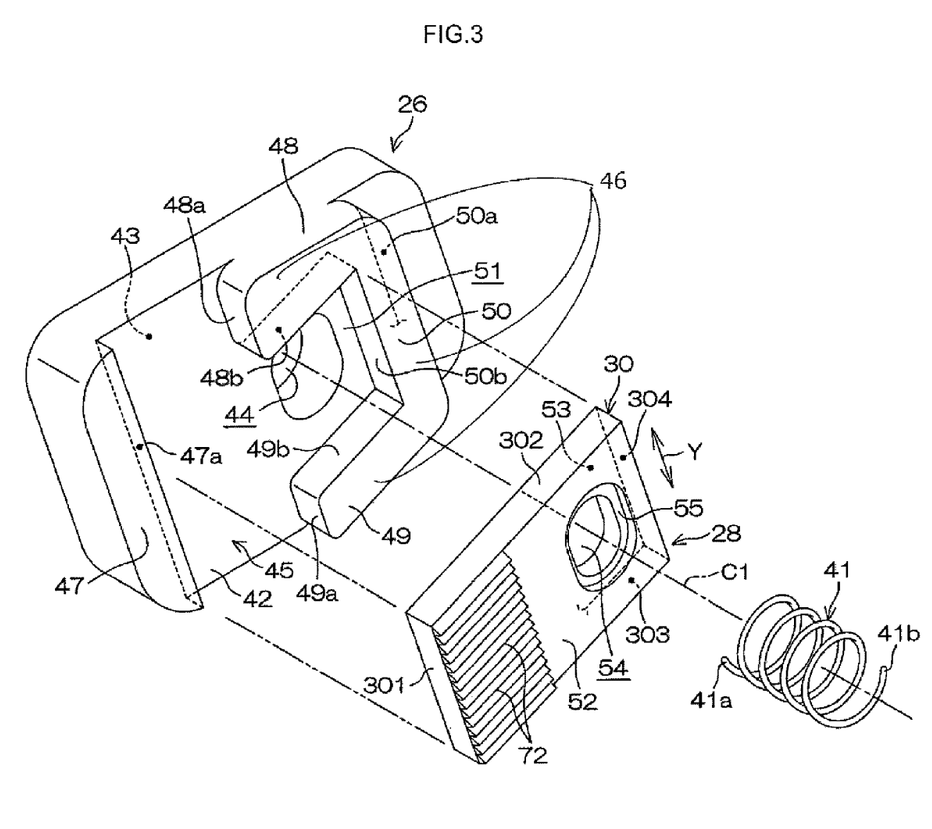
FIG. 3 is an exploded perspective view of a fastening member of a fastening mechanism, a second tooth row forming member of a gear lock mechanism, and a biasing member according to the first embodiment.
Figure 4:
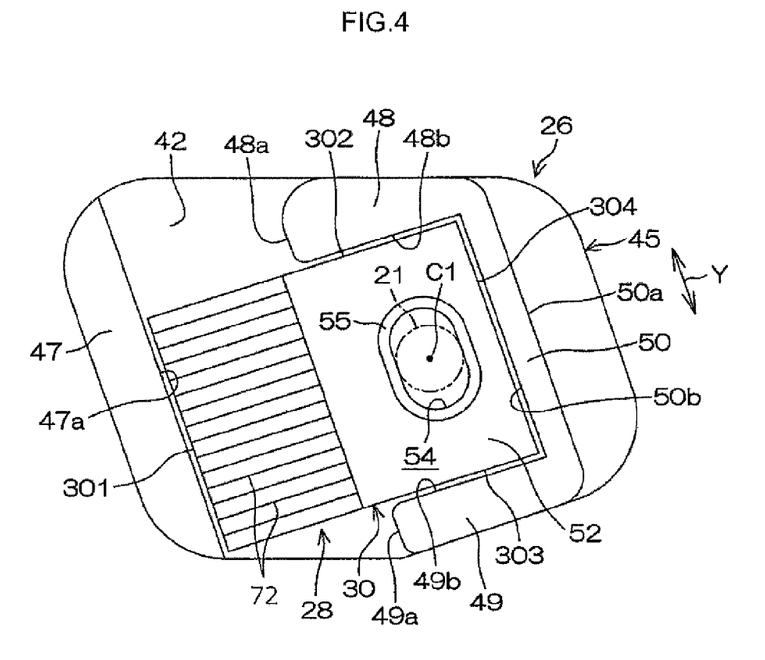
FIG. 4 is a schematic front view of the fastening member and the second tooth row forming member in a combined state according to the first embodiment.

As shown in FIG. 3, the first fastening member 26 as a non-rotatable cam includes a main body 45 that includes a first surface 42 facing the one first side plate 22, a second surface 43 located on the opposite side from the first surface 42, and a fastening shaft through hole 44 extending through the first surface 42 and the second surface 43. The fastening member 26 includes a guided projection 46 and a projection 47. The guided projection 46 projects from the first surface 42 of the main body 45 and is inserted in the tilt elongate hole 23 of the one first side plate 22. The projection 47 projects from the first surface 42 of the main body 45 and faces the one first side plate 22. As shown in FIGS. 3 and 4, the guided projection 46 has a groove shape in section. The guided projection 46 includes a first portion 48 and a second portion 49 which face each other in the tilt direction Y, and a connecting portion 50 that connects one end of the first portion 48 and one end of the second portion 49.

Figure 5:
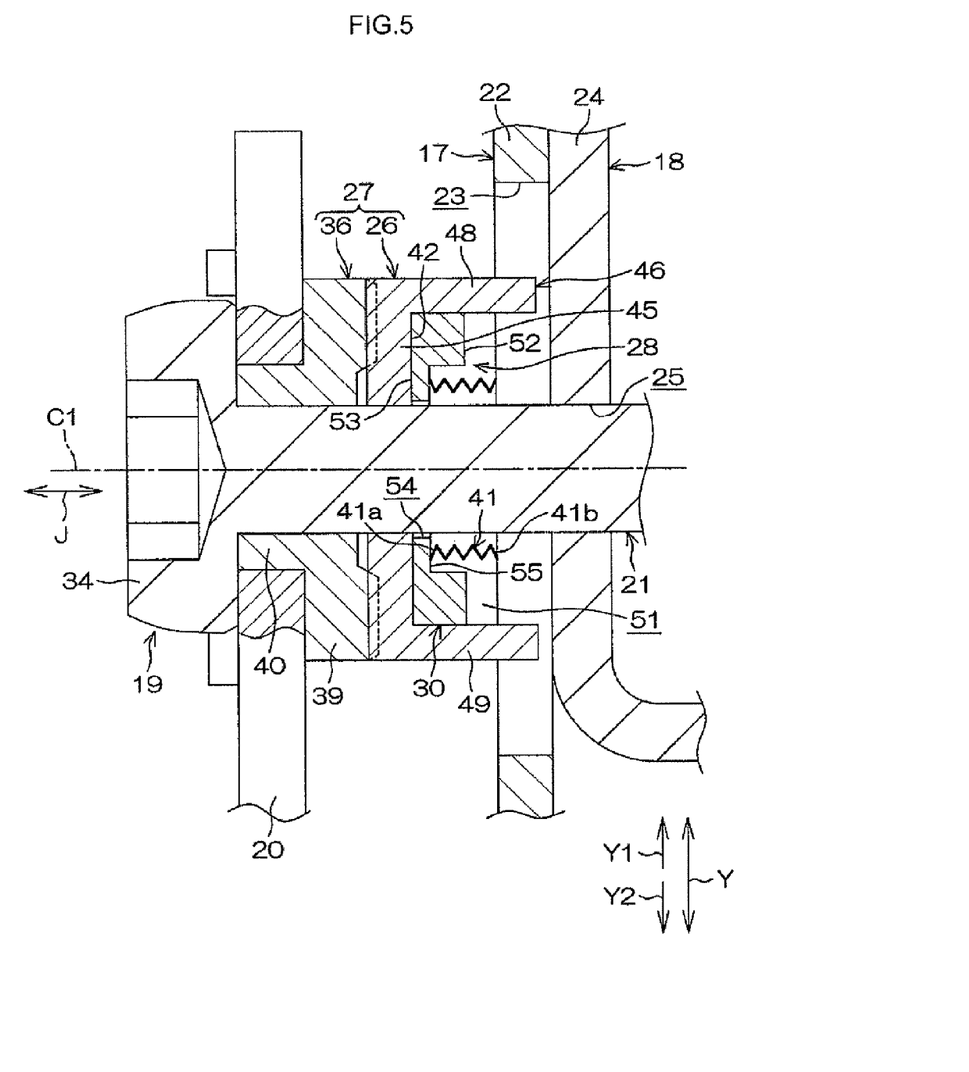
FIG. 5 is an enlarged sectional view of a structure around the fastening mechanism and the gear lock mechanism according to the first embodiment.

As shown in FIG. 5, the guided projection 46 extends into the tilt elongate hole 23 of the one first side plate 22. Rotation of the guided projection 46 is restricted with predetermined play by the tilt elongate hole 23, and the guided projection 46 is guided by the tilt elongate hole 23 when tilt adjustment is made.

Figure 6A:
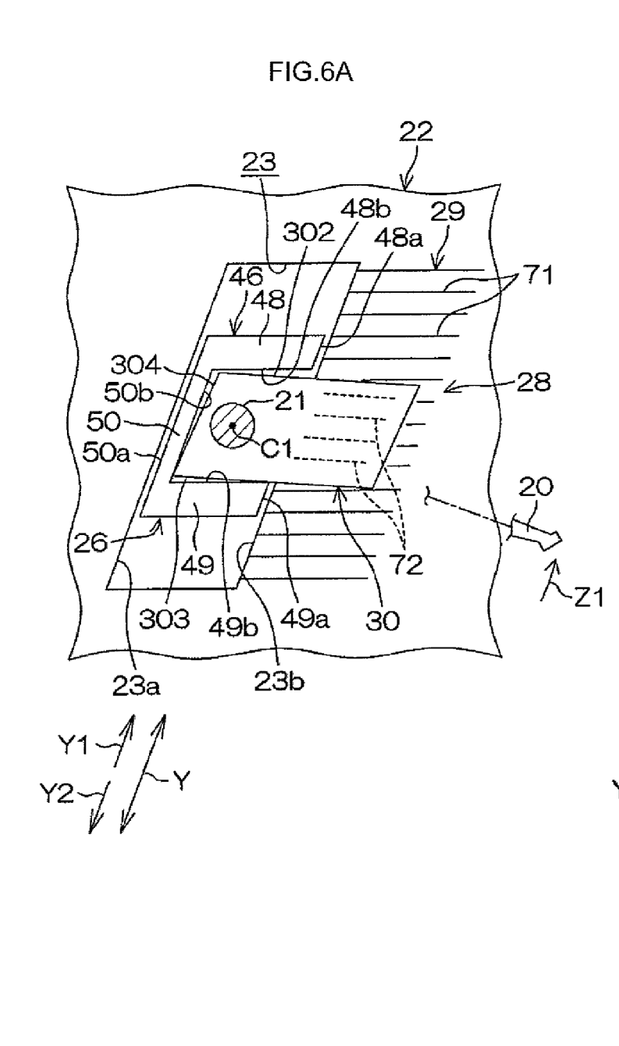
FIG. 6A is a schematic view of the gear lock mechanism, showing an unlocked state.

As shown in FIG. 6A, the tilt elongate hole 23 includes the edges 23a, 23b extending in the tilt direction Y. When tilt adjustment is made, a guided portion 48a provided at the other end of the first portion 48 and a guided portion 49a provided at the other end of the second portion 49 are guided by the one edge 23b of the tilt elongate hole 23, and a guided portion 50a provided in the connecting portion 50 is guided by the other edge 23a of the tilt elongate hole 23.

As shown in FIG. 3, the second tooth row forming member 30 includes a first surface 52 facing the one first side plate 22, and a second surface 53 located on the opposite side from the first surface 52 and received by the first surface 42 of the main body 45 of the fastening member 26. The second tooth row forming member 30 further includes a fastening shaft through hole 54 and the second tooth row 72. The fastening shaft through hole 54 extends from the first surface 52 to the second surface 53, and the fastening shaft 21 is inserted through the fastening shaft through hole 54 with play. The second tooth row 72 is formed on the first surface 52 so as to protrude therefrom.

The direction in which the teeth of the first tooth row 71 are arranged is a longitudinal direction of the tilt elongate hole 23 (which corresponds to the tilt direction Y). The fastening shaft through hole 54 of the second tooth row forming member 30 is an elongate hole extending parallel to the direction in which the teeth of the first tooth row 71 are arranged (which corresponds to the tilt direction Y).

As shown in FIGS. 3 and 4, the guided projection 46 and the projection 47 define a holding space 51 that holds the second tooth row forming member 30 with play. That is, the holding space 51 is formed by a restricting portion 48b as an inner surface of the first portion 48 of the guided projection 46, a restricting portion 49b as an inner surface of the second portion 49 of the guided projection 46, a restricting portion 50b as an inner surface of the connecting portion 50 of the guided projection 46, and a restricting portion 47a as an inner surface of the projection 47.

As shown in FIG. 4, the restricting portions 47a, 48b, 49b, 50b are placed near four edges 301, 302, 303, 304 corresponding to four sides of the second tooth row forming member 30 having a substantially rectangular shape, and face the four edges 301, 302, 303, 304, respectively. The restricting portions 47a, 48b, 49b, 50b function to restrict rotation of the second tooth row forming member 30 about the central axis C1 of the fastening shaft 21 to the predetermined range.

As shown in FIGS. 3 to 5, a spring seat 55 formed by, for example, an annular stepped portion is provided on an inner periphery of the fastening portion through hole 54. One end 41a of the biasing member 41 is received by the spring seat 55, and the other end 41b of the biasing member 41 is received by the one first side plate 22. The biasing member 41 may be a compression coil spring as shown in the figures, or may be a flat spring such as a disc spring.

As shown in FIG. 2, the second fastening member 37 includes a main body 56 and a guided projection 57. The main body 56 has a plate shape, and faces the other first side plate 22 of the first bracket 17. The guided projection 57 projects from the main body 56 and is inserted in the tilt elongate hole 23 of the other first side plate 22.

The guided projection 57 extends into the tilt elongate hole 23 of the other first side plate 22. Rotation of the guided projection 57 is restricted with predetermined play by the tilt elongate hole 23, and the guided projection 57 is guided by the tilt elongate hole 23 when tilt adjustment is made.

The interposing member 38 includes a washer 58 interposed between the nut 35 and the main body 56 of the second fastening member 37, and a needle roller bearing 59 interposed between the washer 58 and the main body 56 of the second fastening member 37.

A sleeve 60 that rotates together with the fastening shaft 21 is fitted on an outer periphery of a shaft portion of the fastening shaft 21 by, e.g., serration fitting. A push-up cam 61 is provided on an outer periphery of the sleeve 60 so as to be rotatable together with the sleeve 60.

When the operation lever 20 is rotated, the rotatable cam 36 rotates relative to the first fastening member 26 (non-rotatable cam) accordingly. The first fastening member 26 is thus moved in the axial direction J of the fastening shaft 21, and the first side plates 22 of the first bracket 17 are held and fastened between the main body 45 of the first fastening member 26 and the main body 56 of the second fastening member 37.

The first side plates 22 of the first bracket 17 are thus respectively pressed against the second side plates 24 of the second bracket 18, whereby a lock operation after tilt adjustment and a lock operation after telescopic adjustment are performed. Simultaneously with the fastening by the fastening members 26, 27, the second tooth row 72 of the first fastening member 26 meshes with the first tooth row 71 to lock the gear. A firm lock operation after tilt adjustment is therefore carried out. The push-up cam 61 pushes up the lower jacket 12, whereby relative movement between the jackets 11, 12 is restricted, and a lock operation after telescopic adjustment is carried out.

Figure 6B:
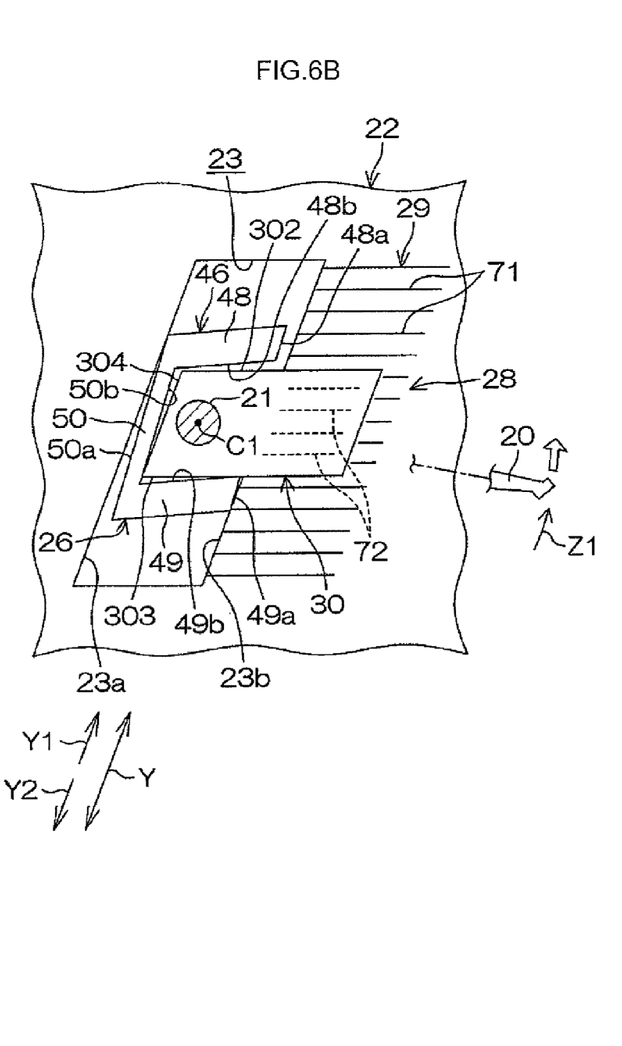
FIG. 6B is a schematic view of the gear lock mechanism, showing a locked state.

According to the present embodiment, in order to switch from an unlocked state shown in FIG. 6A to a locked state shown in FIG. 6B, the fastening member 26 rotates slightly in the lock direction Z1 in the range of the play while pressing the second tooth row forming member 30 toward the first side plate 22 in a lock operation of rotating the operation lever 20 in the lock direction Z1. With the slight rotation of the fastening member 26, the second tooth row forming member 30 also rotates slightly in the lock direction Z1 via the restricting portion 49b. The second tooth row 72 of the second tooth row forming member 30 is aligned with and meshes with the first tooth row 71 during the slight rotation of the second tooth row forming member 30. This can prevent occurrence of a half lock.

There is play between the fastening shaft through hole 54 of the second tooth row forming member 30 and the fastening shaft 21. Accordingly, the second tooth row 72 can be more easily made to mesh with the first tooth row 71 by shifting the second tooth row forming member 30 relative to the fastening shaft 21. This can prevent occurrence of a half lock.

The teeth of the first tooth row 71 are arranged in the longitudinal direction of the tilt elongate hole 23 (the tilt direction Y), and the fastening shaft through hole 54 of the second tooth row forming member 30 is an elongate hole extending parallel to the direction in which the teeth of the first tooth row 71 are arranged (the tilt direction Y). Accordingly, the second tooth row forming member 30 can be shifted relative to the fastening shaft 21 in a direction parallel to the direction in which the teeth of the first tooth row 71 are arranged. This can more reliably prevent occurrence of a half lock.

The lock direction Z1 of the operation lever 20 is the direction in which the operation lever 20 is pushed up about the central axis C1 of the fastening shaft 21. Accordingly, even if the second tooth row forming member 30 has been shifted about the central axis C1 of the fastening shaft 21 to a stable position due to its own weight and the second tooth row 72 has not been aligned with the first tooth row 71 by an unlock operation as shown in FIG. 6A, the second tooth row 72 can be aligned with the first tooth row 71 by lifting the second tooth row forming member 30 against its own weight as shown in FIG. 6B in a lock operation of pushing up the operation lever 20.

The gear lock mechanism 28 includes the biasing member 41 interposed between the first side plate 22 and the second tooth row forming member 30. This allows the second tooth row 72 to be reliably disengaged from the first tooth row 71 in the unlock operation by the action of the biasing member 41.

Figure 7:
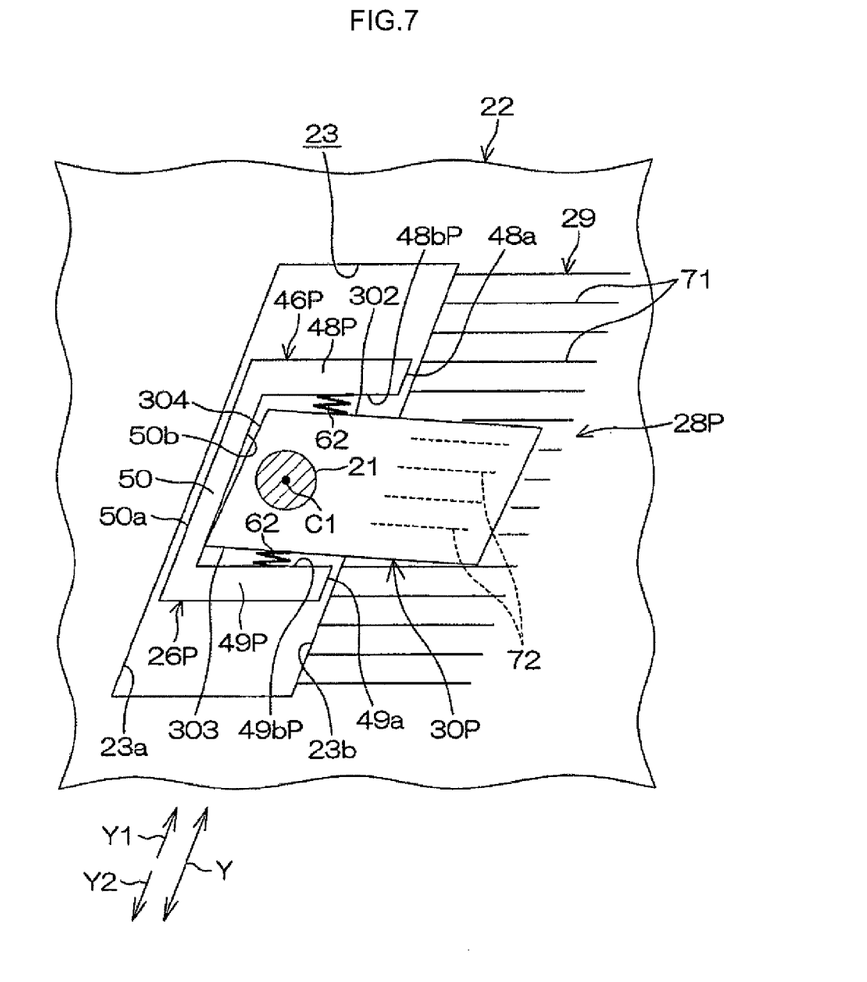
FIG. 7 is a schematic front view of a fastening member and a second tooth row forming member in a combined state according to a second embodiment of the present invention.

FIG. 7 is a schematic front view of a fastening member 26P and a second tooth row forming member 30P in a combined state according to a second embodiment of the present invention.

The second embodiment is mainly different from the first embodiment of FIG. 4 in that a gear lock mechanism 28P includes first elastic members 62 that are interposed between the second tooth row forming member 30P and restricting portions 48bP, 49bP of a guided projection 46P of the fastening member 26P to elastically support the second tooth row forming member 30P about the central axis C1 of the fastening shaft 21 (i.e., in the tilt direction Y).

The first elastic members 62 are provided on respective sides of the second tooth row forming member 30 in the tilt direction Y. The first elastic members 62 elastically bias the second tooth row forming member 30 in opposite directions to each other. One of the first elastic members 62 is interposed between the restricting portion 48bP of a first portion 48P of the guided projection 46P and a corresponding edge 302 of the second tooth row forming member 30. The other first elastic member 62 is interposed between the restricting portion 49bP of a second portion 49P of the guided projection 46P and a corresponding edge 303 of the second tooth row forming member 30.

Among the components of the second embodiment of FIG. 7, the same components as those of the first embodiment of FIG. 4 are denoted with the same reference characters as those of the components of the first embodiment of FIG. 4.

According to the present embodiment, the second tooth row forming member 30P can be prevented from wobbling relative to the fastening member 26P and producing a rattling sound due to vibrations etc. of a vehicle. Moreover, an axial load that is applied to the tooth rows 71, 72 can be prevented from increasing rapidly to such a load that abnormal noise is generated in a lock operation.

Figure 8:
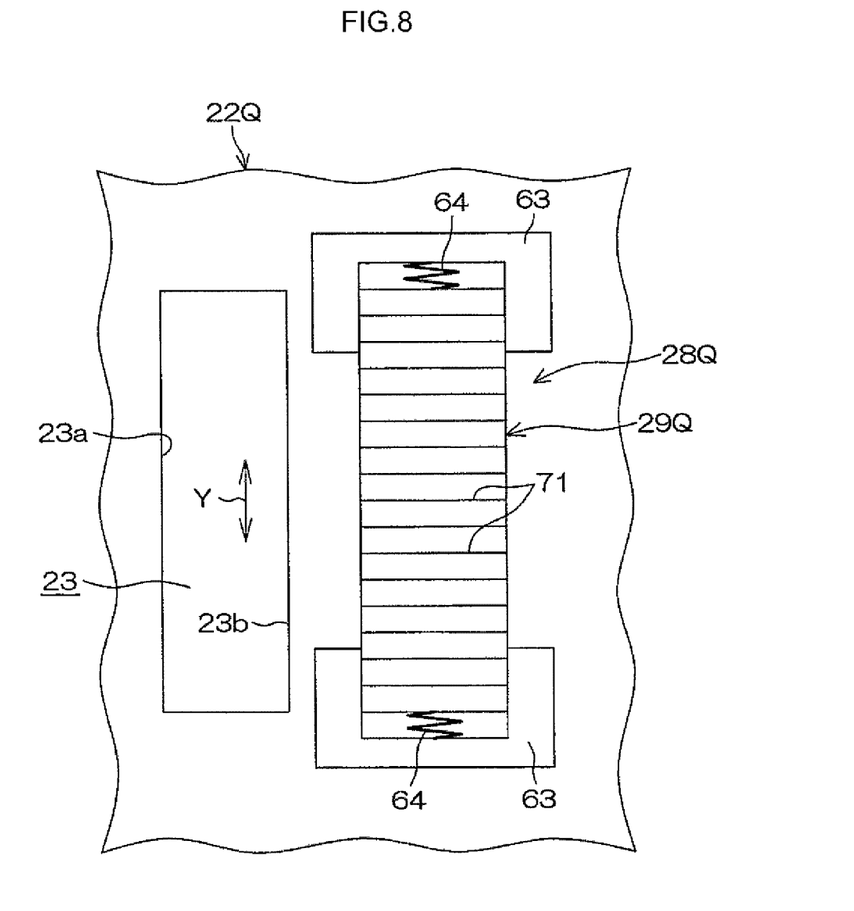
FIG. 8 is a schematic view of a first side plate having a first tooth row forming member attached thereto according to a third embodiment of the present invention.

FIG. 8 is a schematic diagram of a first side plate 22Q having a first tooth row forming member 29Q attached thereto according to a third embodiment of the present invention.

The third embodiment of FIG. 8 is mainly different from the first embodiment of FIG. 1 in that a gear lock mechanism 28Q includes the first tooth row forming member 29Q elastically supported by the first side plate 22Q. That is, the gear lock mechanism 28Q includes holding portions 63 that are provided on the first side plate 22Q to hold the first tooth row forming member 29Q so that the first tooth row forming member 29Q can move by a predetermined amount in the direction in which the teeth of the first tooth row 71 are arranged. The gear lock mechanism 28Q further includes second elastic members 64 that are interposed between the first tooth row forming member 29Q and the holding portions 63 to elastically support the first tooth row forming member 29Q in the direction in which the teeth of the first tooth row 71 are arranged (the tilt direction Y).

The second elastic members 64 are provided on respective sides of the first tooth row forming member 29Q in the tilt direction Y. The second elastic members 64 elastically bias the first tooth row forming member 29Q in opposite directions to each other. The holding portions 63 may be groove-shaped members that are disposed on respective sides of the first tooth row forming member 29Q in the tilt direction Y to hold respective ends of the first tooth row forming member 29Q.

One of the second elastic members 64 is interposed between one end of the first tooth row forming member 29Q and one of the holding portions 63. The other second elastic member 64 is interposed between the other end of the first tooth row forming member 29Q and the other holding portion 63. The second elastic member 64 may be a compression coil spring as shown in the figure, or may be a leaf spring (not shown).

Among the components of the third embodiment of FIG. 8, the same components as those of the first embodiment of FIG. 1 are denoted with the same reference characters as those of the components of the first embodiment of FIG. 1.

According to the present embodiment, the first tooth row forming member 29Q can be prevented from wobbling relative to the holding portions 63 on the first side plate 22Q and producing a rattling sound. Moreover, an axial load that is applied to the tooth rows 71, 72 can be prevented from increasing rapidly to such a load that abnormal noise is generated in a lock operation.

The present invention is not limited to the above embodiments. For example, the gear lock mechanism may further be provided between the other side plate and the second fastening member. The first tooth row forming member 29, 29Q can be placed at any position near at least one of the pair of edges 23a, 23b of the tilt elongate hole 23.

What is claimed is:

1. A steering apparatus, comprising:
a steering shaft having a steering member coupled thereto;
a steering column rotatably supporting the steering shaft and being pivotable about a tilt center;
a first bracket that includes a first side plate having a tilt elongate hole as a first through hole and that is fixed to a vehicle body;
a second bracket that includes a second side plate having a second through hole and that is fixed to the steering column; and
a lock mechanism including a fastening shaft that is passed through the tilt elongate hole and the second through hole, an operation lever that rotates together with the fastening shaft, a fastening mechanism that includes a fastening member supported by the fastening shaft and that translates a rotary motion of the operation lever in a lock direction into a linear motion of the fastening member in an axial direction of the fastening shaft to fasten the first side plate to the second side plate by the fastening member, and a gear lock mechanism that performs a gear lock operation when the fastening is carried out by the fastening mechanism; wherein
the fastening member includes a main body facing the first side plate, and a guided projection which extends from the main body into the tilt elongate hole, whose rotation is restricted with predetermined play by the tilt elongate hole, and which is guided by the tilt elongate hole when tilt adjustment is made,
the gear lock mechanism includes a first tooth row forming member that is provided on the first side plate and that forms a first tooth row formed by parallel teeth arranged in a tilt direction, and a second tooth row forming member that forms a second tooth row formed by parallel teeth that mesh with the first tooth row in a lock operation, and that is interposed between the main body of the fastening member and the first side plate and rotatably supported by the fastening shaft, and
the fastening member includes a restricting portion that restricts rotation of the second tooth row forming member about a central axis of the fastening shaft to a predetermined range.

2. The steering apparatus according to claim 1, wherein the second tooth row forming member includes a fastening shaft through hole having the fastening shaft passed therethrough with play.

3. The steering apparatus according to claim 2, wherein the direction in which the teeth of the first tooth row are arranged is a longitudinal direction of the tilt elongate hole, and
the fastening shaft through hole of the second tooth row forming member is an elongate hole extending parallel to the direction in which the teeth of the first tooth row are arranged.

4. The steering apparatus according to claim 1, wherein the lock direction of the operation lever is a direction in which the operation lever is pushed up about the central axis of the fastening shaft.

5. The steering apparatus according to claim 1, wherein the gear lock mechanism includes a biasing member that is interposed between the first side plate and the second tooth row forming member to disengage the second tooth row from the first tooth row in an unlock operation.

6. The steering apparatus according to claim 1, wherein the gear lock mechanism includes a first elastic member that is interposed between the restricting portion and the second tooth row forming member to elastically support the second tooth row forming member about the central axis of the fastening shaft.

7. The steering apparatus according to claim 1, wherein the gear lock mechanism includes a holding portion that is provided on the first side plate to hold the first tooth row forming member so that the first tooth row forming member can move by a predetermined amount in the direction in which the teeth of the first tooth row are arranged, and a second elastic member that is interposed between the holding portion and the first tooth row forming member to elastically support the first tooth row forming member in the direction in which the teeth of the first tooth row are arranged.

* * * * *